United States Patent [19]
Hall et al.

[11] Patent Number: 5,469,256
[45] Date of Patent: Nov. 21, 1995

[54] MULTIPOLE MAGNETIC GEOMETRY FOR A RING LASER GYROSCOPE

[75] Inventors: David B. Hall, Crescenta; Leo K. Lam, Canoga Park, both of Calif.

[73] Assignee: Litton Systems, Inc., Woodland Hills, Calif.

[21] Appl. No.: 228,308

[22] Filed: Jul. 29, 1988

[51] Int. Cl.$^6$ .............................. G01C 19/64; H01S 3/10
[52] U.S. Cl. ........................... 356/350; 372/94; 359/281; 359/283
[58] Field of Search ........................... 356/350; 350/375, 350/376, 378; 372/94, 32, 37

[56] References Cited

U.S. PATENT DOCUMENTS

| | | | |
|---|---|---|---|
| 115,018 | 10/1887 | Martin | 356/350 |
| 4,451,811 | 5/1984 | Hoffman | 335/302 |
| 4,548,501 | 10/1985 | Smith | 356/350 |

OTHER PUBLICATIONS

"Compact and Highly Efficient Faraday Rotators Using Relatively Low VErdet Constant Faraday Materials" by Toshihiko Yoshino, Japanese Journal of Applied Physics vol. 19, No. 4, Apr., 1980 pp. 745–749.
"Single Crystal Growth & Magneto–Optical Properties of Bi, Al–Substituted Magnetic Garnets" By T. Tamaki, H. Kaneda, K. Tsushima, IEEE Translation Journal on Magnetics in Japan, vol. TJMJ–2, No. 1, Jan. 1987.
"A Compact, High–Performance Optical Isolator" by Kuniro Tsushima, JEE, Jan. 1984.
"Compact Optical Isolator for Near–Infrared Radiation" By Atsushi Shibukawa & Akinori Katsui, Electronics Letters vol. 13, No. 24, 24 Nov. 1977.
"Thin–film Waveguide Magneto–Optic Isolator", by R. Wolfe et al., Applied Physics Letters 46 (9), 1 May 1985.
"Applications of Magneto–Optics in Ring Laser Gyroscopes" by J. J. Krebs, et al., IEEE Transactions on Magnetics vol. Mag. 16, No. 5, Sep. 1980.
Yoshino, T., "Compact and Highly . . . Faraday materials"; Spn. S. Appl. Phys., vol. 19, #4, pp. 745–749, Sep. 1980; Abst. only provided.
Tamaki et al, "Magneto–optical . . . isolator"; 9th Annu. Mtg. of Mag. Soc. of Spn, Nov. 29, 1985, vol. TJMS–2, #1, pp. 89–90, Jan. 1987; abst. provided.
Tsushima, K. "A compact . . . Optical Isolator"; JEE, vol. 21, #205, pp. 78–80, Jan 1984; abst. provided.
Shibukawa et al, "Compact Optical Isolator . . . "; Electron-Lett., vol. 13, #24, pp. 721–722, Nov. 24, 1977; abst provided.
Wolfe et al, "Thin–film waveguide magneto–optic isolator"; Appl. Phys. Lett., vol. 46, #9, pp. 817–819, May 1, 1985, abst. Provided.
Krebs et al., "Applications of . . . Laser Gyroscopes"; vol. MAG–16, #5, pp. 1179–1184, Sep. 1980; abst. Provided.

*Primary Examiner*—Nelson Moskowitz
*Attorney, Agent, or Firm*—L. David Rish; James F. Kirk; Chester E. Martine, Jr.

[57] ABSTRACT

Disclosed herein is a multi-pole magnetic geometry for a multi-oscillator ring laser gyroscope. Multi-pole magnetic geometry configurations are disclosed which are useful for providing Faraday rotation where the multi-oscillator uses a Faraday rotator and high magnetic field effect where the nature of the multi-oscillator ring laser gyroscope is of split gain configuration. The multi-post magnetic geometry includes a plurality of top or bottom loaded diametrically opposed north and south pole axially directed magnets which are positioned substantially transverse to the optical pathway but suitable for providing axially directed magnetic fields to portions of the optical pathway only where desired. The multi-pole magnetic geometry disclosed herein substantially produces a magnetic flux that is restricted in its position to localized portions of the optical pathway with low far field effects.

14 Claims, 4 Drawing Sheets

FIG. 7
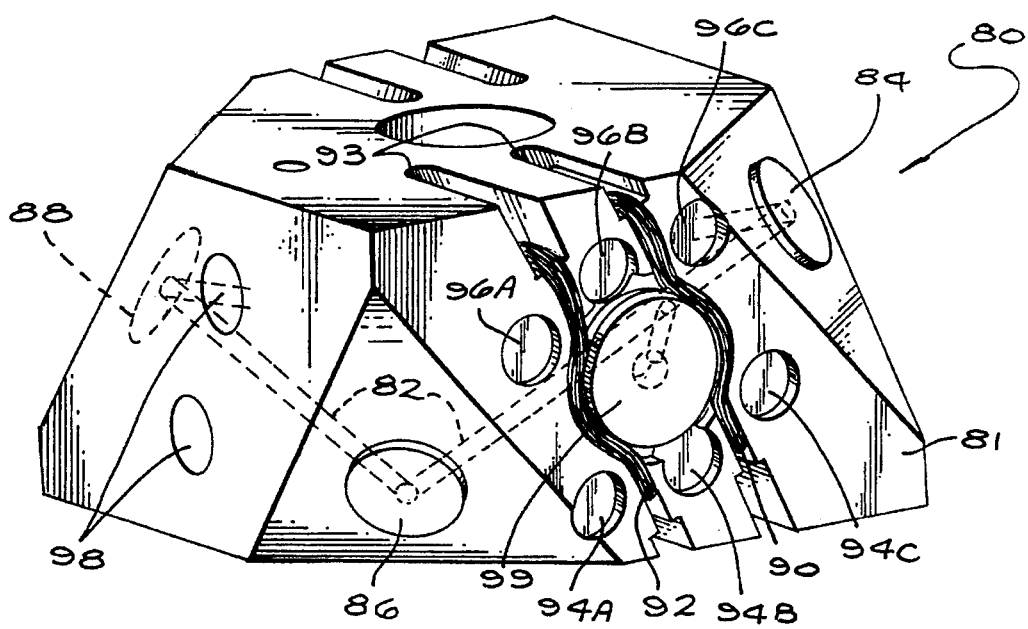
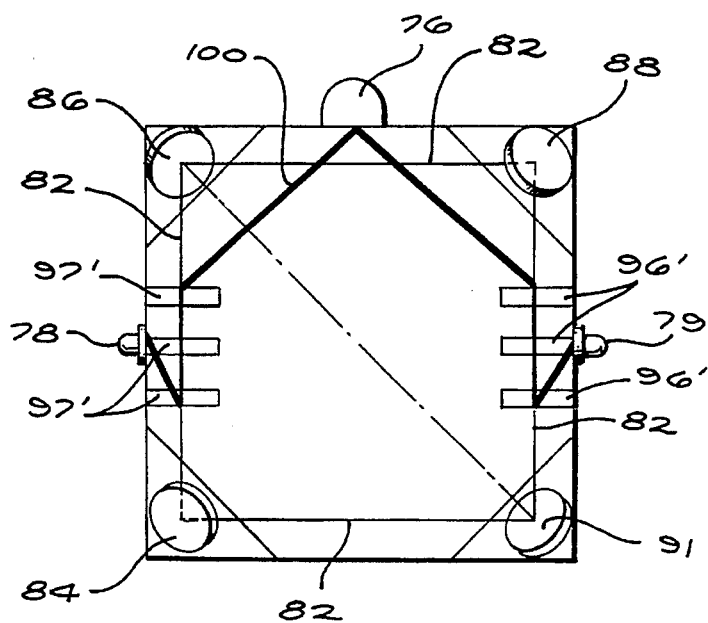
FIG. 8

FIG. 9
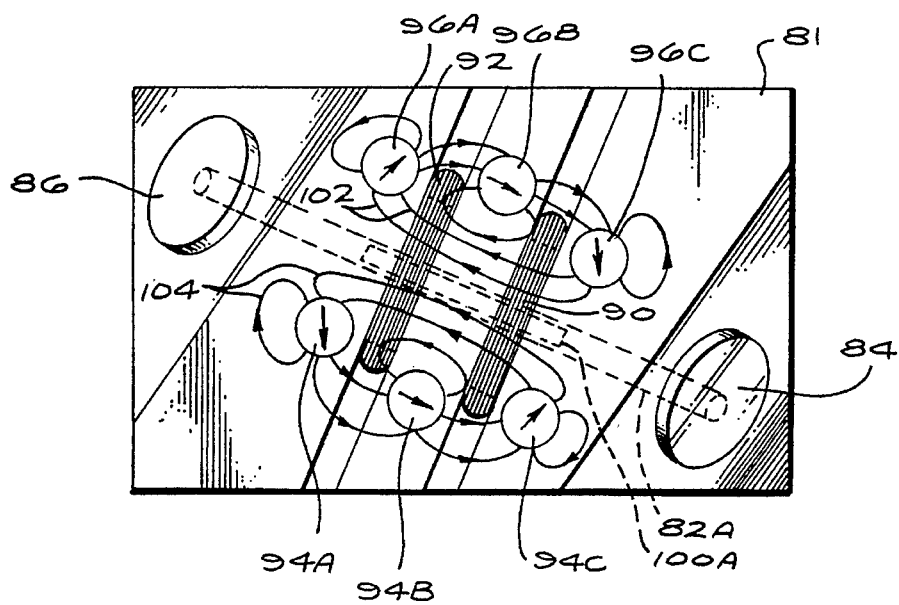
MAGNETIC FIELD VS. DISTANCE
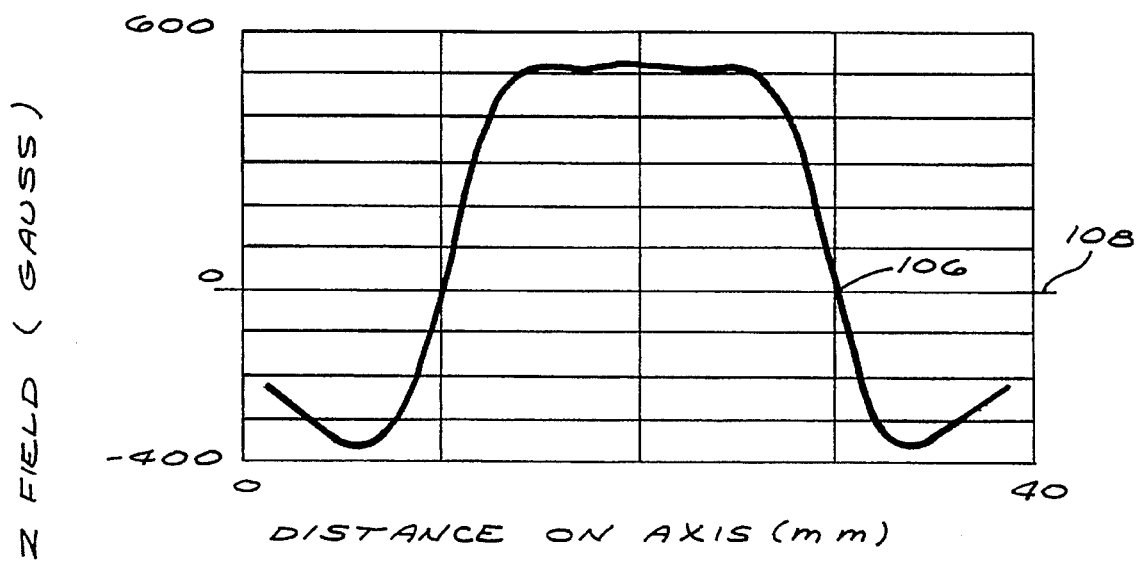
FIG. 10

MULTIPOLE MAGNETIC GEOMETRY FOR A RING LASER GYROSCOPE

BACKGROUND OF THE INVENTION

1. Field of the Invention

This invention relates to ring laser gyroscopes, and more particularly to ring laser gyroscopes having magnetic sources external to the bore cavity of the closed path defining the gyroscope.

2. Description of the Related Art

Since its introduction in the early 1960's as a laboratory experiment, the ring laser gyroscope has been commercially developed as a logical replacement for the mechanical gyroscope for use in all manner of inertial guidance systems. Heretofore, the basic two mode ring laser gyroscope has been developed which has two independent electromagnetic wave modes oscillating in an optical ring cavity. When the ring is stationary, no rotation is ideally indicated. As the ring cavity is rotated about its central axis, the counter-rotating waves interact with one another so that a beat frequency is developed. A linear relationship between the beat frequency and the rotation rate of the cavity with respect to the inertial frame of reference may be established. Ideally, the rotation rate is proportional to the beat note. In this manner a gyroscope is theoretically produced having no moving parts.

In practice, however, the two mode laser gyroscope often must be mechanically dithered to keep the counter rotating travelling waves from locking at low rotation rates. For more information on planar gyroscope two mode lock in, please see *Laser Applications*, edited by Monte Ross, pp. 133–200 (1971). In an effort to solve this lock-in problem, non-planar ring cavities have been designed containing more than one pair of counter rotating modes. These multi-oscillator ring laser gyroscopes have been developed to achieve the goal of an accurate all optical gyroscope having no moving parts. However, these multi-oscillator ring laser gyroscopes require the use of a non-reciprocal polarization rotation device (such as a Faraday rotator) to achieve the splitting of the light within the ring cavity into two pairs of counter rotating modes. Generally, the multi-oscillator ring laser gyroscope is divided into a pair of right circularly polarized and left circularly polarized waves. The right circularly polarized waves are split by the Faraday rotator into clockwise and anti-clockwise modes. Likewise, the left circularly polarized waves are split by the rotator into clockwise and anti-clockwise modes. For a full discussion of the multi-oscillator ring laser gyroscope, please see LASER HANDBOOK (vol. IV) edited by M. L. Stitch (1985), pp. 229–332. A non-planar configuration comprising at least four mirrors and a non-reciprocal Faraday rotator is described in Smith, U.S. Pat. No. 4,548,501 issued Oct. 22, 1985. In such a non-planar configuration, reciprocal rotation is accomplished by the non-planar geometry of the multi-mode ring laser gyroscope. The out-of-planeness geometry in a folded rhombus ring laser gyroscopes provides the necessary the reciprocal splitting into left and right circularly polarized beams. However, the clockwise and anti-clockwise component of each circularly polarized beam are essentially locked at low rotation rates. In order to further split the right and left circularly polarized beams into their clockwise and anti-clockwise frequency components, a non-reciprocal rotator means such as a Faraday rotator is used. Since the left and right circularly polarized sets of beam modes are widely separated in frequency, the multi-mode ring laser gyroscope avoids the problem of mode lock-in common to two mode ring laser gyroscopes.

Critical to the success of non-reciprocal splitting in a multi-oscillator ring laser gyroscope is the need to provide a uniform low gradient magnetic field inside the Faraday rotator disk. Alternatively, an all optical out-of-plane geometry ring laser gyroscope having no intra-cavity elements for either reciprocal or non-reciprocal splitting is disclosed in a patent application assigned to the common assignee of this application and entitled "SPLIT GAIN MULTI-MODE RING LASER GYROSCOPE AND METHOD" by Graham Martin, Ser. No. 115,018, dated Oct. 28, 1987, now U.S. Pat. No. 5,386,288 (placed under secrecy order May 17, 1988). As is disclosed in detail in the cited co-pending application, this alternative ring laser gyroscope uses high and uniform magnetic fields to achieve a split of the gain curve into Q and (Q+1) modes so as to achieve a desired effect that is equivalent to Faraday rotation. This split of the gain is achieved by the use of high power, highly concentrated, magnetic fields properly positioned along the bore cavity of the ring laser gyroscope.

Heretofore, the multi-oscillator ring laser gyroscope and the split gain ring laser gyroscope have applied axial magnetic fields along a segment of the closed path formed by the bore cavity by use of cylindrical, hollow magnets positioned parallel and around the bore segment or within the segment. In the multi-oscillator ring laser gyroscope, a Faraday rotator glass was typically concentrically mounted within a tubular axially directed magnet, the entire assembly being "musket-loaded" into the bore cavity where the Faraday rotator is aligned and positioned in the optical pathway. This is a difficult and time-consuming procedure. The "musket-loading" of the Faraday rotator and magnet assembly must not scratch the side wall of the bore cavity. Such "musket-loading" assembly of the Faraday rotator of the multi-oscillator ring laser gyroscope was difficult to assemble. Also it is difficult to place the magnets within the cavity bore separate from the evacuated region.

In the case of the split gain multi-mode ring laser gyroscope, an entire leg segment of the monolithic glass block from which the ring laser gyroscope is manufactured must be carved out to accommodate a hollow cylindrical magnet which is positioned in parallel to the closed pathway and around said pathway. This design requires severe and costly machining of a segment of the closed path and bore cavity of the ring laser gyroscope in order to accommodate the placement of the cylindrical magnet about the segment. The split gain ring laser gyroscope requires precision machining in order to accommodate the placement of a permanent magnet of a cylindrical form around the outer portion of the body of the ring laser gyroscope along a segment of its closed path.

SUMMARY OF THE INVENTION

What is needed is a multi pole magnetic geometry for a ring laser gyroscope which achieves the proper positioning of a strong axially directed magnetic field along a segment of the closed path of the ring laser gyroscope without undue fabrication and machining of the monolithic glass frame.

In order to solve the problems set forth in the Background of the Invention, a ring laser gyroscope is disclosed which has a closed pathway defined by a bore cavity providing out-of-plane reciprocal image rotation of a plurality of electromagnetic wave modes propagating within the pathway. Non-reciprocal polarization rotation is provided by a magnetic geometry system which includes a plurality of primarily tranversely-directed magnetic elements external to the bore cavity defining the closed pathway. Thus, in a multi-oscillator ring laser gyroscope, a plurality of magnetic elements in the form of cylindrically-shaped posts may be positioned along either side of the closed pathway. Each of the magnetic elements may be cylindrically-shaped posts made from a strong permanent magnetic material where each magnetic element is poled along a diameter. Coarse tuning of the magnetic elements may be achieved by rotation of each element within its chamber about each element's axis. Preferably, an equal number of magnetic elements, each providing an equal magnetic strength, are disposed along either side of the segment of the closed pathway within the monolithic body of the ring laser gyroscope. In this manner, the magnetic strength of the field provided by the magnetic element is balanced along a segment of the pathway. The magnetic elements may be configured to form an octopole or a dipole impressed upon an octopole.

For the split gain multi-mode ring laser gyroscope, a resonator cavity may be defined having a closed optical pathway and a gain medium in the cavity. The gain medium is excited for producing at least four lasing modes in the cavity, such that the gain medium provides a corresponding gain curve for each lasing mode. Magnetic means are provided for adjusting the gain medium to produce a frequency shift between selected gain curves for supressing the lasing action of pre-selected modes in the cavity. These magnetic elements include a plurality of transversely directed magnetic posts external to the cavity defining the closed optical path. These magnetic elements, like those disclosed for use with the multi-oscillator ring laser gyroscope, may be coarsely tuned by turning each of the posts within its particular transverse chamber carved into the block and frame forming the ring laser gyroscope.

These and other advantages and invention over existing magnetic geometry configurations for ring laser gyroscopes will be seen by review of the brief description of the drawings and the detailed description of the preferred embodiment of this invention which follows.

BRIEF DESCRIPTION OF THE DRAWINGS

FIG. 7 shows a perspective view of a DC discharge Split Gain gyroscope having post magnets symmetrically positioned at both anodes.

FIG. 8 is a schematic view of the Split Gain gyroscope which uses the multi-pole magnetic geometry of this invention showing where the high field strength magnets are positioned with respect to the discharge.

FIG. 9 is a schematic diagram showing magnetic field line interactions of the six post magnets positioned along a single leg of the optical path of the Split Gain Gyroscope of FIG. 8.

FIG. 10 shows experimental data indicating that the multi-pole magnetic geometry achieves a relatively uniform magnetic field at a designated value in its middle section by proper rotation and alignment of the cylindrical posts.

DETAILED DESCRIPTION OF THE PREFERRED EMBODIMENT

The multi-pole magnetic geometry of this invention has application both to the multi-oscillator ring laser gyroscope which requires a Faraday rotator element for non-reciprocal splitting of counter-rotating beams, as well as the split gain multi-oscillator ring laser gyroscope which contains no intra-cavity elements.

Figure 1:
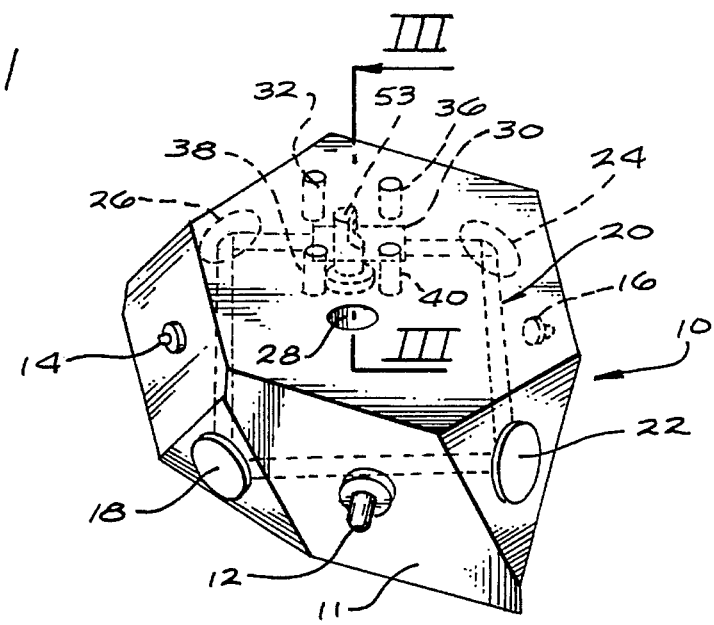
FIG. 1 is a perspective view of a preferred embodiment of the multi-pole magnetic geometry for a ring laser gyroscope which uses a Faraday rotator.
Figure 3:
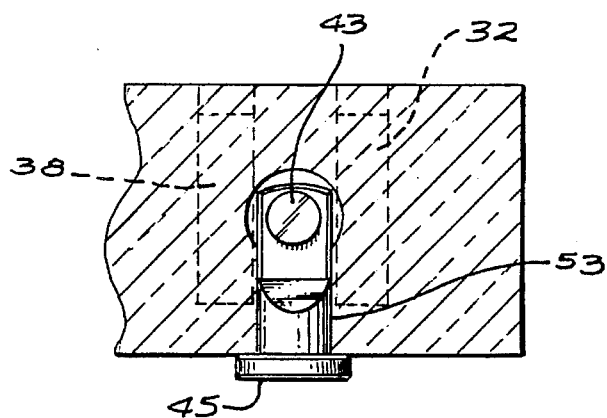
FIG. 3 is a cross-sectional view taken along line III—III of FIG. 1.

With reference to FIGS. 1 and 3, an out-of-plane multi-oscillator ring laser gyroscope is shown at 10 containing a plurality of transversely loaded magnetic poles 32, 36, 38, and 40 about a bore 30 (which contains a Faraday rotator assembly). This multi-oscillator ring laser gyroscope 10 has a monolithic hard glass frame 11, normally made from a ceramic glass material under the registered trademark Zerodur, manufactured by Schott, Optics Division, of Mainz, West Germany. The optical pathway 20 of the multi-oscillator ring laser gyroscope 10 shown in FIG. 1 defines a path connecting corner mirrors 18, 22, 24, and 26. Positioned along one leg of the optical path 20 is a metallized cathode 12 and a pair of side-positioned anodes 14 and 16. The monolithic ring laser gyroscope 10 may be mounted on a central cylinder 28 made from the metallic material Invar, a registered trademark. The Invar 28 assists in isolating the magnetic fields produced by posts 32, 36, 38, and 40 so that minimal far field effects are generated in the gain bore region bound by anodes 14 and 16 and passing by cathode 12.

As is heretofore known in the ring laser gyroscope art, where a multi-oscillator (such as that shown in FIG. 1) has an out-of-plane configuration, reciprocal splitting of two sets of right and left circularly polarized light is achieved due to the out-of-plane geometry of the mirrors 26, 24, 22, and 18 which define the optical pathway 20. Non-reciprocal splitting between counter propagating clockwise and anti-clockwise modes is achieved by use of a Faraday rotator placed within the bore 30 shown in FIG. 1. In order for the Faraday rotator to achieve non-reciprocal rotation, a magnetic field must be applied to the glass rotator 43 (FIG. 3), to cause non-reciprocal splitting of the left and right circularly polarized light. Unlike the "musket loading" design that was used in the prior art, a Faraday rotator 43 may be positioned through side insertion from the bottom of the glass frame into the center of the magnetic field produced by the multi-pole design. The Faraday rotator assembly may be loaded into the glass frame 11 by use of pillar 53 which holds the glass Faraday rotator 43. The rotator 43 and the support pillar 53 may be inserted by use of an optically sealed plug 45. Each of the magnets, such as 32 and 38, may be loaded into their respective bores outside the optical path 20 to provide an axially directed magnetic field having a low gradient, which is normal to the face of the Faraday rotator glass 43. The Invar support bar 28 at the center of the multi oscillator ring laser gyroscope 10 may be used to prevent the magnetic field from interfering with the gain medium discharge positioned between the cathode 12 and each of the anodes 14 and 16.

Figure 2:
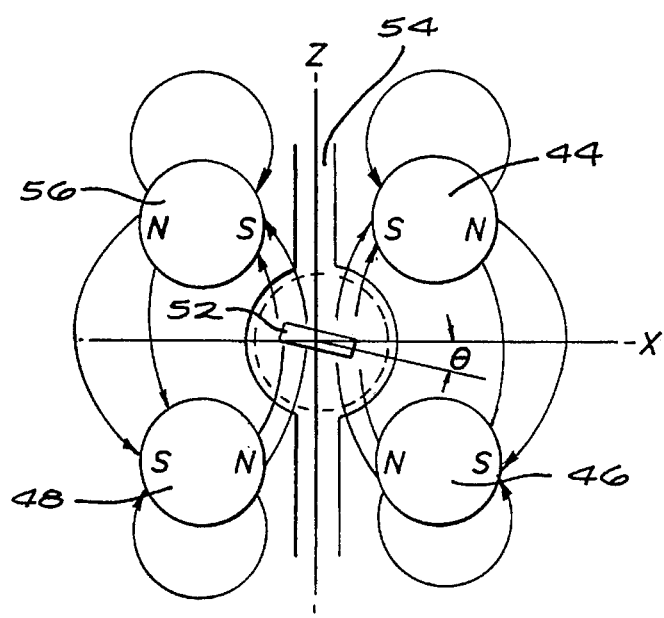
FIG. 2 is a schematic diagram showing a top plan view of a ring laser gyroscope using the multi-pole magnetic geometry taught in this disclosure to apply a magnetic field to a Faraday rotator element.

An example of the magnetic field line distribution which occurs when using the magnetic posts in conjunction with the Faraday glass is shown at FIG. 2. The Faraday rotator glass 52 is positioned within the optical pathway 54 at a slight angle. An octopole construction comprising magnets 44, 46, 48, and 56 is positioned outside but along the optical pathway in order to provide an axially directed magnetic field through the Faraday rotator 52.

It is well known in the art that the degree of Faraday rotation on non-reciprocal splitting of counter-propogating beams that may be achieved is dependent upon the axial length of the Faraday glass rotator glass 52; the magnetic field intensity provided by each of the magnets 44, 46, 48, and 56, acting together in an octopole configuration; and, the Verdet constant, which is related to the particular properties of the glass material selected for use as a Faraday rotator 52. Glasses such as SF 57 or FR 5 are used for the thin Faraday rotator 52 shown in FIG. 2. The configuration of FIG. 2 is suitable to achieve the desired results of an axially directed magnetic field of appropriate strength.

It will be noted that each of the magnets 44 through 56 shown in FIG. 2 are not conventional dipoles (where the north and south poles are at either longitudinal end of the magnets), but rather, the magnetic north and south poles are diametrically opposite one another along the entire axial length of the pole. An example of a radially directed magnet which was used as a bearing is described in U.S. Pat. No. 4,451,811 to Hoffman, which issued May 29, 1984, and is assigned to the common assignee of this invention. The Hoffman patent, however, shows a radially directed magnetic field, while the applicants have chosen diametrically opposed poles for each magnet such that a magnetic field arises transverse to both the axial length of each of the magnets 44 through 56, and the front and back surfaces of the Faraday rotator 52. In this manner, a high far field magnetic flux is established for use with the Faraday rotator assembly of a multi-oscillator ring laser gyroscope.

Figure 5:
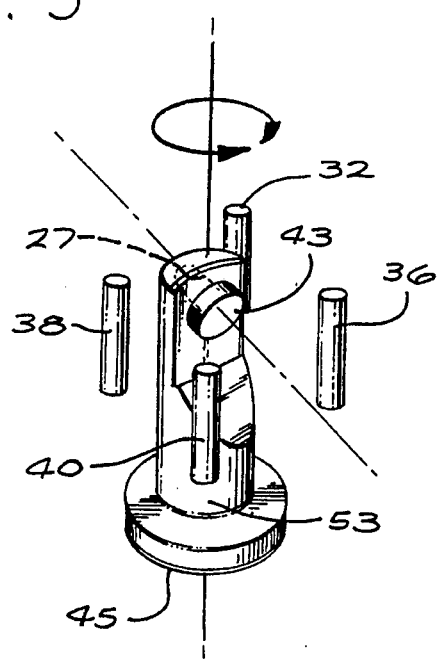
FIG. 5 shows a schematic perspective view of an alternative embodiment of a carrier assembly holding a glass Faraday rotator in conjunction with a multi-pole magnetic geometry design for a ring laser gyroscope.

FIG. 5 shows the assembly of FIGS. 1 and 3 for positioning a glass Faraday rotator 43 along the central axis of the optical path within the four post magnetic geometry. Each of the magnets 32, 36, 38, and 40, are spaced along the central axis of the optical path outside the bore cavity. This assembly is comprised of a pillar 53 supported by a base 45 which may be bottom side mounted into the monolithic frame of a multi-oscillator ring laser gyroscope, like the one shown in FIG. 1. The pillar 53 defines a bore 27, which is axially directed (as shown in FIG. 5) in order that the Faraday rotator 43 be exposed at both its faces to the optical pathway of the ring laser gyroscope.

Figure 4:
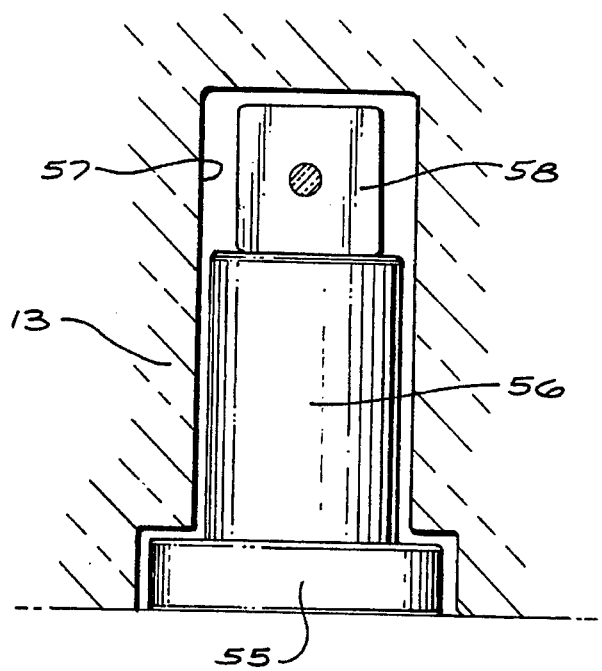
FIG. 4 is a front elevational view of an alternative Faraday rotator assembly for use in conjunction with a multi-pole magnetic geometry that is suitable for radiation hardening conditions.
Figure 6:
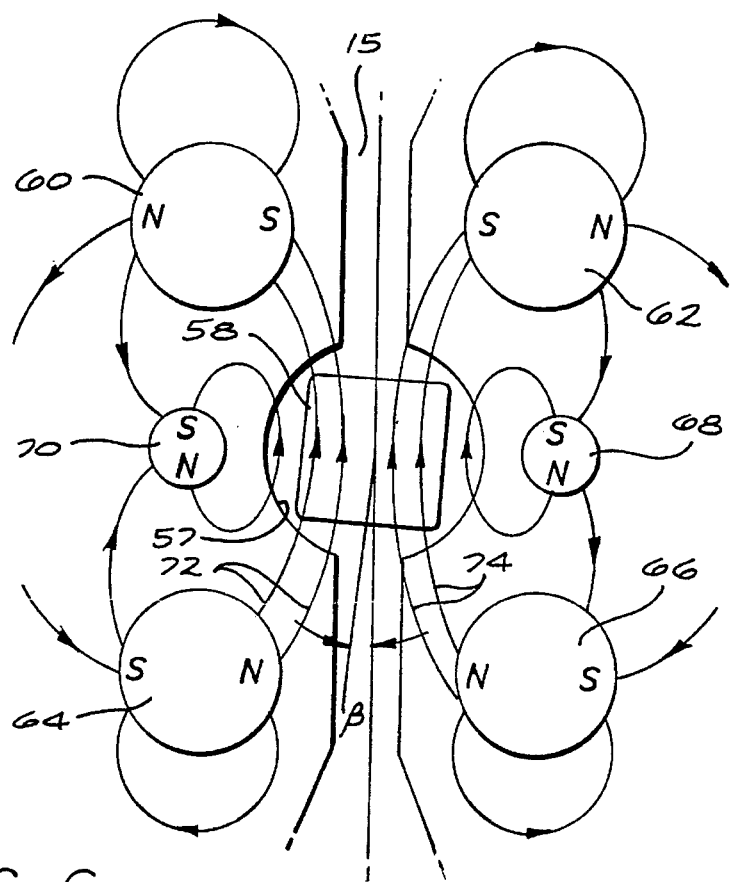
FIG. 6 shows a schematic diagram including the magnetic field lines illustrating the interaction between six different magnets being used in conjunction with a radiation hardened Faraday rotator for a ring laser gyroscope.

FIGS. 4 and 6 show an alternate embodiment of a Faraday rotator assembly which is suitable for use in high radiation environment. The monolithic frame 13 defines a chamber 57 into which a mounting pillar 56 may be inserted from the bottom of the frame 13. The pillar 56, seated on optically contacted plug 55, supports a substantially cube-shaped fused silica Faraday rotator 58. Such a Faraday rotator meets current requirements for operation of the ring laser gyroscope in a nuclear hardened environment. The Faraday rotator 58 is suggested to be shaped as a cube for ease of manufacture. When nuclear hardening is required, and fused silica material is used to make a rotator 58 meeting this requirement, the multi-pole magnetic geometry design must take into account that the Verdet constant for fused silica glass is approximately 1/5 that of the SF 57 glass used in the thin glass Faraday rotator shown in FIGS. 1–3 and FIG. 5. The fused silica Faraday rotator 58 has a substantially lower Verdet constant than the SF 57 glass heretofore used. The Faraday rotator 58, therefore, is about 3–5 times thicker than the conventional glass rotator, in order to provide a comparable degree of non-reciprocal splitting of counter-propogating beams within the optical path of multi-oscillator ring laser gyroscope.

The magnetic fields which are used in the fused silica Faraday rotator assembly may be better tuned using a six post design as shown in FIG. 6. FIG. 6 shows a fused silica rotator 58 positioned within an optical pathway and bore 15. The Faraday rotator 58 has been rotatably mounted within the chamber 57 defined by the glass frame 13 (see FIG. 4). The rotator 58 is also positioned (at an angle beta) off a straight axial line to eliminate retro-reflection within the ring laser cavity. The configuration shown in FIG. 6 depicts an octopole formed by magnets 60, 62, 64, and 66. These magnets provide an axially directed field through the Faraday rotator 58, as depicted in particular by field lines 72 and 74. Since the Faraday rotator 58 is so much thicker than the conventional rotator, 51, in FIG. 5, the field lines 72 and 74 will tend to curve considerably if only the octopole configuration of magnets 60, 62, 66, and 64 were used. Therefore, a dipole 35 configuration, made from the two smaller dipole magnets 70 and 68, have been positioned as shown at FIG. 6 in order to arrange the magnetic flux through the Faraday rotator 58 in a more uniform and flat configuration as the magnetic flux 72 and 74 passes through the fused silica Faraday rotator 58.

It will be noted in all the designs discussed thus far, that each of the magnet posts is of a cylindrical shape. This allows the easy coarse tuning of each of the magnets to properly position their respective diametrically opposed north-south poles to achieve an optimum field condition.

Turning to FIGS. 7 and 8, a DC discharge split gain multi-oscillator ring laser gyroscope is shown. This split gain configuration as taught in U.S. patent application Ser. No. 115,081, filed Oct. 28, 1987, and assigned to the common assignee of this invention, discloses a split gain out-of-plane multi-oscillator configuration which requires no intra-cavity elements. By splitting the gain curves to achieve both Q and Q+1 modes, four active modes, two of which are counter-propagating, may be achieved without the need for a Faraday rotator element. However, to achieve the split gain desired in order for this multi-oscillator ring laser gyroscope to properly operate, strong but localized magnetic fields are needed which surround the gain medium in order to cause the split gain effect to arise and match the split gain curves with lasing mode frequencies. In the DC discharge design illustrated in both FIGS. 7 and 8, two sets of bores 96' and 97' surround each of the anodes 78 and 79 to achieve high magnetic fields along the only portion of the discharge pathway which overlaps the optical pathway 82, between the out-of-plane mirrors 84, 86, 88, and 91.

With reference to FIG. 7, post magnets 94A, 94B, and 94C are each inserted into the lower post position under the anode receiving mount 99. Post magnets 96A, 96B and 96C may be positioned above the optical pathway 82 at the anode mount position 99. The monolithic frame 81 of the multi-oscillator split gain ring laser gyroscope 80 is carved to form a set of grooves, such as 93, to accomodate the positioning of DC wire coil 92 and 90 about either side of the anode mount 99, between the posts of the magnetic geometry configuration formed by magnets 94A, 94B, 94C, 96A, 96B and 96C. These coils 92 and 90 are close to a Helmholtz pair configuration and may be used to electronically fine tune the magnetic field produced by the magnetic posts 94A, 94B, 94C, 96A, 96B and 96C, so as to precisely match the split gain curves with the frequencies of the lasing modes.

With reference to FIG. 9, this view is taken along that portion of the optical pathway 82A between mirrors 86 and 84. The fine tuning coil 92 and 90 are shown containing a portion of the DC gain 100A within the axial distance between magnet 96A and 96C and magnets 94A and 94C. The magnetic flux lines 102 and 104 are substantially uniform through the gain medium 100A in order to provide a strong and symmetrical gain curve for each lasing mode.

The experimental results of magnetic fields produced by the multi-pole magnetic geometry (6 posts) disclosed in this application is shown at curve 106 in FIG. 10. It will be noted that the curve 106 crosses the axis line 108 at either side of the curve, at about 10 and 30 mm.

In this manner, a multi-oscillator ring laser gyroscope using a Faraday element such as shown in FIG. 1 may provide a uniform magnetic field at the Faraday rotator with minimal far field effects, thereby averting unintentional Zeeman effects upon the glow discharge medium defined between the cathode 12 and each of the anodes 14 and 16. The test results shown in FIG. 10 indicate that the multi-pole magnetic geometry of this disclosure provides the high strength isolated magnetic field. Such uniformity of field strength also allows the split gain ring laser gyroscope to achieve maximum field strength where the excited medium 100A (FIG. 9) is positioned along the optical pathway 82A, while preventing far field interference with the optical pathway outside the gain medium.

Therefore an optimum and simply constructed multi-pole geometry is disclosed for use in a ring laser gyroscope. This geometry is preferably made from cylindrical posts which may be oriented at the time of construction to provide coarse tuning and direction for the magnetic field. While four and six post designs have been disclosed, other combinations of magnetic posts may be envisioned which provide the balanced and uniform low far field magnetic field needed for both multi-oscillator ring laser gyroscopes disclosed herein. Therefore, it is desired that the appended claims be construed to cover not only the preferred and alternative embodiments disclosed herein, but also equivalent multi-pole magnetic geometry configurations which may also be used in multi-oscillator and split gain ring laser gyroscopes.

What is claimed is:

1. A ring laser gyroscope comprising:

a closed pathway defined by a bore cavity providing out-of-plane reciprocal image rotation of a plurality of electromagnetic waves propagating within said pathway; and, means for providing non-reciprocal polarization rotation of said waves including magnetic means;

said magnetic means including a plurality of external magnetic elements, each magnetic element being adjustably mounted for rotation about its own axis and transversely directed with respect to the bore cavity defining said closed pathway.

2. The ring laser gyroscope of claim 1, wherein:

said magnetic elements are cylindrically-shaped posts made from a permanent magnetic material where the north and south poles of each magnetic element are each positioned on opposite sides of a diameter of each of said posts;

whereby, a magnetic field passes within a plane that is orthogonal to said post.

3. The ring laser gyroscope of claim 2, wherein:

said magnetic elements are disposed within a monolithic body, each of the magnetic elements being disposed within a chamber that is transversely directed with respect to said bore cavity;

coarse tuning of said magnetic elements being achieved by rotation of each element about its own axis within its respective chamber.

4. The ring laser gyroscope of claim 3, wherein:

an equal number of magnetic elements, each producing a magnetic field of equal strength, are disposed along either side of a segment of said pathway with said monolithic body, whereby, magnetic field strength is balanced along said segment of said pathway.

5. A ring laser gyroscope comprising:

a closed pathway defined by a bore cavity providing out-of-plane reciprocal image rotation of a plurality of electromagnetic waves propagating within said pathway;

means for providing non-reciprocal polarization rotation of said waves including magnetic means;

said magnetic means including a plurality of external magnetic elements, transversely directed with respect to the bore cavity defining said closed pathway;

said magnetic elements being cylindrically-shaped posts made from a permanent magnetic material where the north and south poles of each magnetic element are each positioned on opposite sides of a diameter of each of said posts, the magnetic elements providing a magnetic field passing within a plane that is orthogonal to each of said posts;

said magnetic elements disposed within a monolithic body, each of the magnetic elements being disposed within a chamber that is transversely directed with respect to said bore cavity;

each magnetic element being rotatable about its own axis, within its respective chamber, so that coarse tuning of said magnetic elements may be achieved;

an equal number of magnetic elements, each producing a magnetic field of equal strength, disposed along either side of a segment of said pathway with said monolithic body; and, four of said magnetic elements configured to form an octopole in order to provide a uniform magnetic field through a segment of said closed pathway.

6. The ring laser gyroscope of claim 5, wherein a dipole configuration of magnetic elements is imposed over said octopole to strengthen said field, and extend the uniformity of said field.

7. The ring laser gyroscope of claim 6, wherein, said gyroscope includes:

a fused quartz faraday rotator which is substantially nuclear hardened, providing non-reciprocal polarization of said electromagnetic waves.

8. A ring laser gyroscope, comprising:

a resonator cavity defining a closed optical pathway and a gain medium in said cavity;

medium excitation means for producing at least four lasing modes in said cavity such that the gain medium provides a corresponding gain curve for each lasing mode;

magnetic means for adjusting the gain medium to produce a frequency shift between selected gain curves for suppressing the lasing action of preselected modes in the cavity providing a split gain effect;

said magnetic means including a plurality of primarily transversely directed magnetic elements external to the cavity defining the closed optical path.

9. The ring laser gyroscope of claim 8, wherein:

said magnetic elements are cylindrically-shaped posts made from a permanent magnetic material where the north and south poles of each magnetic element are each positioned on opposite sides of a diameter of each of said posts;

whereby, a magnetic field passes within a plane that is orthogonal to said post.

10. The ring laser gyroscope of claim 9, wherein:

said magnetic elements are disposed within a monolithic body, each magnetic element disposed within a transversely directed chamber;

coarse tuning of said magnetic elements being achieved by rotation of each element within each chamber about each element's axis.

11. The ring laser gyroscope of claim 10, wherein: an equal number of magnetic elements, each producing a magnetic field of equal strength, are disposed along either side of a segment of said pathway with said monolithic body, whereby, magnetic field strength is balanced along said segment of said pathway.

12. The ring laser gyroscope of claim 11, wherein:

four magnetic elements are configured to form an octopole in order to provide a uniform magnetic field through a segment of said closed pathway.

13. The ring laser gyroscope of claim 12, wherein:

dipole configuration of magnetic elements is imposed over said octopole to strengthen said field and extend the uniformity of said field.

14. The ring laser gyroscope of claim 1, wherein:

said means for providing non-reciprocal polarization rotation of said waves includes a Faraday rotator; and, each of said external magnetic elements are mounted within a chamber that is positioned outside the closed pathway and not in contact with said Faraday rotator;

whereby, said Faraday rotator will not be contaminated by said magnetic elements.

* * * * *